United States Patent
Bardon et al.

(10) Patent No.: US 10,128,011 B2
(45) Date of Patent: Nov. 13, 2018

(54) DEVICE FOR SUPPORTING PACKAGING FOR TRANSPORTING/STORING RADIOACTIVE MATERIALS, INCLUDING A SHROUD FOR GUIDING AIR FOR COOLING THE PACKAGING BY NATURAL CONVECTION

(71) Applicant: TN INTERNATIONAL, Montigny le Bretonneux (FR)

(72) Inventors: Olivier Bardon, Chaville (FR); Laurent Poque, Paris (FR); Ludovic Garnier, Virey (FR)

(73) Assignee: TN INTERNATIONAL, Montigny le Bretonneux (FR)

( * ) Notice: Subject to any disclaimer, the term of this patent is extended or adjusted under 35 U.S.C. 154(b) by 0 days.

(21) Appl. No.: 15/560,021

(22) PCT Filed: Mar. 24, 2016

(86) PCT No.: PCT/EP2016/056593
§ 371 (c)(1),
(2) Date: Sep. 20, 2017

(87) PCT Pub. No.: WO2016/151094
PCT Pub. Date: Sep. 29, 2016

(65) Prior Publication Data
US 2018/0068752 A1    Mar. 8, 2018

(30) Foreign Application Priority Data

Mar. 25, 2015 (FR) ..................................... 15 52512

(51) Int. Cl.
*G21F 5/10* (2006.01)
*G21F 5/14* (2006.01)
(Continued)

(52) U.S. Cl.
CPC ........... *G21F 5/10* (2013.01); *B60H 1/00264* (2013.01); *B60P 3/20* (2013.01); *B61D 3/16* (2013.01); *G21F 5/005* (2013.01); *G21F 5/14* (2013.01)

(58) Field of Classification Search
CPC ... G21F 5/10; G21F 5/005; G21F 5/14; B60H 1/00264; B60P 3/20; B60P 3/16
(Continued)

(56) References Cited

FOREIGN PATENT DOCUMENTS

| FR | 2 467 468 A1 | 4/1981 |
|----|--------------|--------|
| FR | 2 973 925 A1 | 10/2012 |

(Continued)

OTHER PUBLICATIONS

International Preliminary Report on Patentability issued in Patent Application No. PCT/EP2016/056593 dated Feb. 6, 2017.
(Continued)

*Primary Examiner* — Nicole Ippolito
*Assistant Examiner* — Hanway Chang
(74) *Attorney, Agent, or Firm* — Pearne & Gordon LLP

(57) ABSTRACT

The invention relates to a device (3) for supporting packaging for transporting/storing radioactive materials (1) in a horizontal position, the supporting device including a structural base (10) and structures (12) for supporting the packaging, which structures are supported by the base (10) and project upwards therefrom. According to the invention, the device also includes, located at least in part above the structural base (10), a shroud (30) for guiding air for cooling the packaging by natural convection, the shroud (30) defining a recess (32) which is open towards the top and into which a portion of the packaging is intended to be inserted when the packaging (1) is supported in a horizontal position
(Continued)

on the device, the shroud (30) including, at the bottom thereof, at least one opening (34) for allowing cooling air into the recess (32).

24 Claims, 4 Drawing Sheets

(51) Int. Cl.
*B60H 1/00* (2006.01)
*B60P 3/20* (2006.01)
*B61D 3/16* (2006.01)
*G21F 5/005* (2006.01)

(58) Field of Classification Search
USPC .......................................... 250/505.1, 506.1
See application file for complete search history.

(56) References Cited

FOREIGN PATENT DOCUMENTS

| | | |
|---|---|---|
| JP | 2001-235582 A | 8/2001 |
| JP | 2009-244045 A | 10/2009 |
| WO | 2014/167026 A1 | 10/2014 |

OTHER PUBLICATIONS

Written Opinion issued in Patent Application No. PCT/EP2016/056593 dated Jun. 27, 2016.
International Search Report issued in Patent Application No. PCT/EP2016/056593 dated Jun. 27, 2016.
Search Report issued in French Patent Application No. FR 1552512 dated Feb. 22, 2016.

DEVICE FOR SUPPORTING PACKAGING FOR TRANSPORTING/STORING RADIOACTIVE MATERIALS, INCLUDING A SHROUD FOR GUIDING AIR FOR COOLING THE PACKAGING BY NATURAL CONVECTION

TECHNICAL FIELD

The present invention relates to the field of radioactive material transport and storage. It relates more particularly to the transport/storage in a horizontal position of a package intended to contain radioactive materials.

STATE OF PRIOR ART

A radioactive material transporting/storing package has usually a side body, a bottom and a lid. These package parts define a cavity for housing radioactive materials, for example fresh or spent nuclear fuel assemblies, or waste cases. Moreover, a basket can be arranged within the housing cavity to define compartments in which the different cases/assemblies are placed.

For storing the package on different sites and/or transporting it between these sites, the package is placed on a supporting device, on which it rests in a horizontal position. The supporting device forms an entity on its own, or is integrated to a road or railway transport system. In any case, this supporting device is designed to fulfil the mechanical support function for the package in a horizontal position, whereas the cooling function is ensured by the outer surface of the package that forms an exchange surface. In the case of a strong power, this exchange surface can besides be increased using fins arranged at the periphery of the side body of this package. With or without fins, a strong spatial heterogeneity in the temperatures can be found, both due to an enhancement in the thermal load downwardly because of the contact of the basket on the inner surface of the cavity, but also to a lesser efficiency of the natural convection in the bottom part of the package, where the air is yet insufficiently accelerated.

Thus, even in the presence of the cooling fins, the bottom part of the package makes up a particularly hot zone when the same rests horizontally on the supporting device, the temperature distribution being not homogeneous all around the side body of the package. Heat dissipation may not be sufficiently efficient in this hot zone, because the ambient air has difficulties in coming as closely as possible to this zone. This problem is also found when the side body is not covered with cooling fins.

To limit the extent of this hot zone of the package as well as its temperature, it can be contemplated to add cooling fins or to improve the efficiency thereof. However, that requires high development and set-up costs. Another solution consists in decreasing the thermal power which is allowed within the package, such that the hot zone generated meets the qualification criteria for sensitive materials making up the package, as the neutron absorbing resin. However, the decrease in the thermal power which is allowed inevitably results in decreasing the amount of radioactive materials transportable by the package, which negatively impacts the operation requirements.

DISCLOSURE OF THE INVENTION

Thus, the purpose of the invention is to overcome at least partially the abovementioned drawbacks, relating to embodiments of prior art.

To that end, one object of the invention is a supporting device for supporting a radioactive material transporting/storing package in a horizontal position, the supporting device comprising a structural base as well as supporting means for supporting the package which are carried by said structural base from which they upwardly project. According to the invention, the supporting device further comprises, being located at least partly above the structural base, a cooling air guide shroud of the package by natural convection, said shroud defining an upwardly open cavity in which a part of the package is intended to be housed when this package is supported in a horizontal position on the device, said shroud comprising, in a bottom part thereof, at least one aperture for taking in cooling air in said cavity.

Advantageously, the shroud specific to the invention enables the storage cooling in a horizontal position, at its bottom part, to be improved, by virtue of a natural convection effect. The invention thus is a solution enabling the hot zone at the bottom part of the package to be reduced or even removed, at a lesser cost without lowering the thermal power which is allowed.

Moreover, the fact that the shroud is integrated to the device for supporting device the transport/storage package, and not to the package itself, provides the following advantages:

dispensing with the operation problems, in particular when the package is immersed in a pool for loading spent fuel assemblies. Indeed, if the package had to be provided with such an envelope as is for example suggested in document FR 2 467 468, the contaminated water of the pool could thereby penetrate the envelope through the air intake aperture, thus making the decontamination of the package particularly complex before transport;

the shroud according to the invention, which forms a kind of envelope about the external surface of the package, is intended to improve package cooling in a horizontal configuration. In the solution of document FR 2 467 468, providing such an envelope on the package as well as structural elements to attach the envelope to the package, can strongly compromise the efficiency of cooling the same when in a vertical position, as assumed in particular in a storage configuration. This drawback does not occur in the invention, since the shroud is integrated to the support;

generally, transferring the "cooling of the bottom part of the package" function to the support enables it to be decorrelated from other safety conventional functions of the package. Thus, it is not necessary to justify the envelope impact, which is a further structural characteristic, towards regulatory requirements;

still in the case where the package is equipped with such an envelope, its overall dimension can thereby become incompatible with facilities. Conversely, if a same overall diameter is desired to be preserved, that results in reducing the package capabilities.

The integration of the shroud within the supporting device also makes it possible to:

reduce the number of envelopes/shrouds to be made, and thus decrease the coasts since a same supporting device is intended to a fleet of several packages;

reduce the technical problem related to thermal aspects, without modifying existing packages: it is sufficient to place them on the support in accordance with the present invention;

optimise the shroud to reduce the hot zone at the bottom part of the package. Indeed, with the suggested invention, it is not necessary to fully wrap the package. In particular, a shroud is not required in the top part when the package is considered in a horizontal position, whereas prior art suggests a shroud fully wrapping the package. On the contrary, the invention is a simpler and less bulky solution which makes it possible to address satisfactorily/in an optimised way the technical problem of cooling a localised zone (bottom point of the package).

The invention preferably has at least one any of the following optional characteristics, taken alone or in combination.

Said supporting means comprise first supporting means intended to receive a package head part, as well as second supporting means intended to receive a package bottom part, said first and second supporting means being axially spaced apart by an axial spacing distance (Dea), and the air guide shroud has preferably an axial length (La) substantially identical to the axial spacing distance (Dea).

Said shroud includes a first axial end attached to said first supporting means, as well as a second axial end attached to said second supporting means.

Alternatively, or simultaneously with the solution of attachment on the supporting means just being mentioned, said shroud is attached to said structural base of the supporting device.

The axial spacing distance (Dea) is between 1.5 and 4 m.

Said shroud is generally of a semi-cylindrical shape, pierced by said at least one cooling air intake aperture.

For example, the transverse cross-section of said shroud is generally of a semi-circular shape.

According to another example, the transverse cross-section of said shroud is generally of a semi-octagonal shape, the side closest to the structural base of which is arranged in parallel with the horizontal direction. Preferably, the median axial vertical plane of the supporting device, which is orthogonal to the plane of the transverse cross-section of the shroud, makes up a plane of symmetry for the shroud. Advantageously, by virtue of the tilted side of the semi-octagonal cross-section, the shroud can suck a greater air amount and facilitate the gradual downward descent of cold air. In addition, the semi-octagonal shaped structure has the advantage to resemble a cylindrical shape and thus enables a cooling air channel with a thickness more or less constant to be achieved, while at a lesser cost.

In the case of the semi-octagonal cross-section, said side closest to the structural base is pierced by said at least one cooling air intake aperture.

In this regard, said at least one cooling air intake aperture is preferably such that it is arranged at a bottom point of the shroud. That advantageously contributes to improving cooling, because the air stream can circulate on or in close proximity with the hot bottom point of the package. Alternatively, the cooling air intake aperture can be arranged in the proximity of a bottom point of the shroud, and not precisely on the same bottom point.

Said at least one cooling air intake aperture extends on the entire axial length (La) of the shroud, and, more generally, preferably on at least 90% of this axial length of the shroud.

Said at least one cooling air intake aperture has a transverse width between 100 and 500 mm, and is preferentially in the order of 300 mm.

A free space is provided under said shroud, said free space having, at a bottom point of the shroud, an under-shroud height between 50 and 400 mm, and preferentially in the order of 200 mm.

In this regard, it is noted that in some cases, the structural base includes stringers connecting the supporting means, as in the case of a conventional chassis. In this case, the bottom point of the shroud can be located below a top point of the stringers, that is the shroud is partly arranged in the space defined between the stringers, but always with a minimal under-shroud height as defined above.

Preferably, said under-shroud height is higher than or equal to half the transverse width of the cooling air intake aperture.

By way of indicating purposes, said shroud has a thickness between 1 and 5 mm, preferably made using a bent plate, in particular in the case of the generally semi-octagonal shaped cross-section.

According to a first application, the supporting device forms a package transporting/storing chassis, possibly intended to be manipulated with the package when the same is supported by the device. In this case, the chassis can for example be placed on the platform of a radioactive material transporting system, for example the platform of a railroad car belonging to a railway transport system, or even the platform of a trailer belonging to a road transport system.

According to a second application, the structural base forms all or part of a platform of a railroad car belonging to a railway transport system, or forms all or part of a platform of a trailer belonging to a road transport system. In this application, the supporting device according to the invention is directly integrated to the structure of the transport system, such that it is not designed to be manipulated, but intended to remain fixedly on the vehicle of which it is an integral part.

The invention has also the object to provide an assembly comprising a radioactive material transporting/storing package, as well as a supporting device as described above, said package being supported in a horizontal position on said device, with a part of a side body of the package housed in said cavity defined by the cooling air guide shroud.

Preferably, said package includes manipulation trunnions, and said means for supporting the device include housings each receiving one of said trunnions.

According to another possibility, said means for supporting the device include at least two cradles on which the side body of the package rests.

Regardless of the design retained, the side body of the package includes preferably an external diameter between 1 and 2.5 m.

To improve draught, the cooling air guide shroud has preferably two opposite transverse ends, each located on or in the proximity of a median axial horizontal plane of the package.

Preferentially, the internal surface of the shroud and the external surface of the side body of the package define therebetween a cooling air circulation channel, with an average thickness between 50 and 200 mm.

In this regard, it is noted that the shroud fulfils two functions. The first function, being essential, consists in entering fresh air down the package. The second function consists in circulating at best air about the package, once the same has entered the shroud. By nature of the natural convection, the air which circulates is stuck to the side wall of the package. However, draught is actually more efficient with a shroud substantially parallel to the side surface of the side body of the package.

Thus, preferentially, it is contemplated that the internal surface of the shroud and the external surface of the side body of the package define there between a cooling air circulation channel with a substantially constant thickness.

In other words, both these surfaces are substantially parallel, so as to maximise the sucking flow rate, and improve thereby draught.

Finally, one object of the invention is to provide a road or railway radioactive material transporting system, comprising a supporting device as described above, said structural base of the supporting device being fastened to a platform of the transport system, or forming all or part of this platform.

Further advantages and characteristics of the invention will appear in the non-limiting detailed description below.

BRIEF DESCRIPTION OF THE DRAWINGS

This description will be made with regard to the append drawings in which.

DETAILED DESCRIPTION OF PARTICULAR EMBODIMENTS

Figure 1:
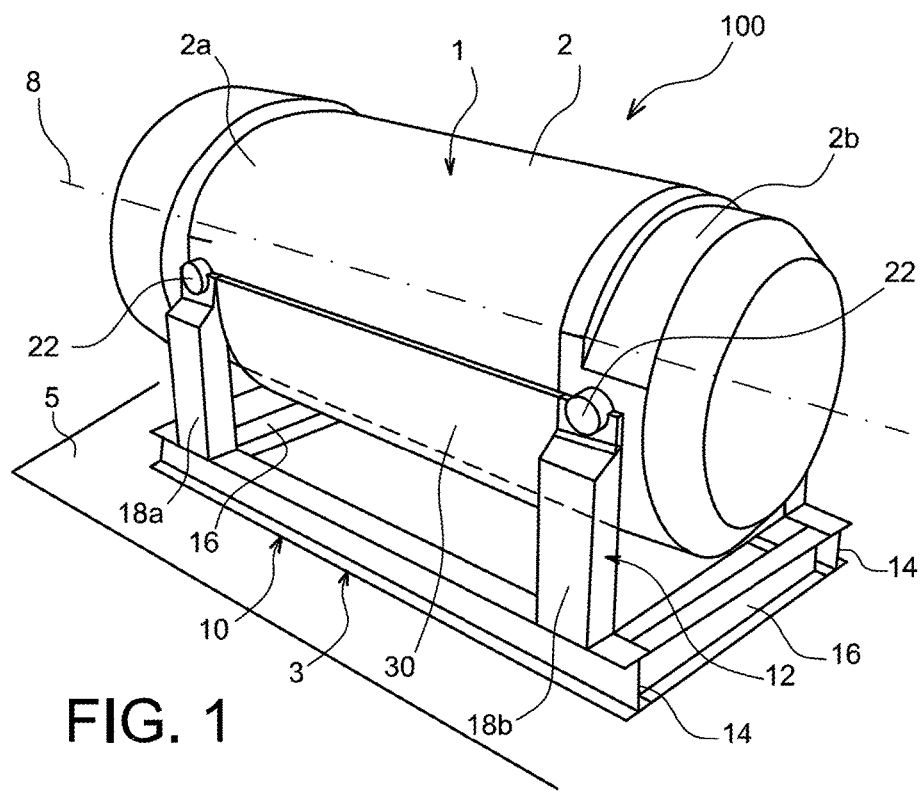
FIG. 1 represents a perspective view of an assembly according to a first preferred embodiment of the invention, integrating a radioactive material transporting/storing package as well as its supporting device.
Figure 2:
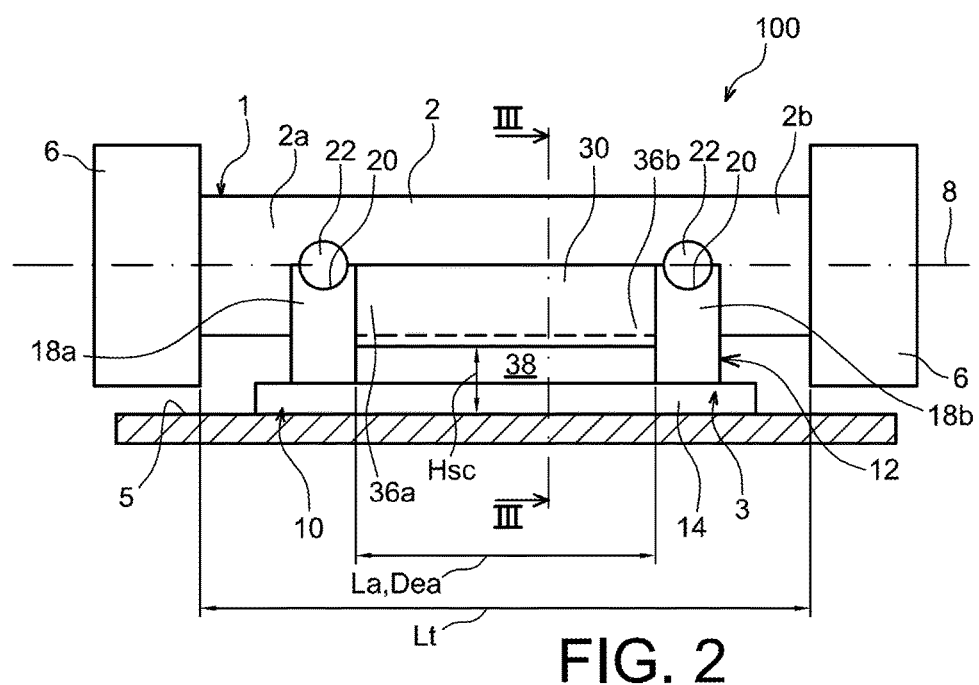
FIG. 2 is a side view of the assembly shown in the previous figure.
Figure 3:
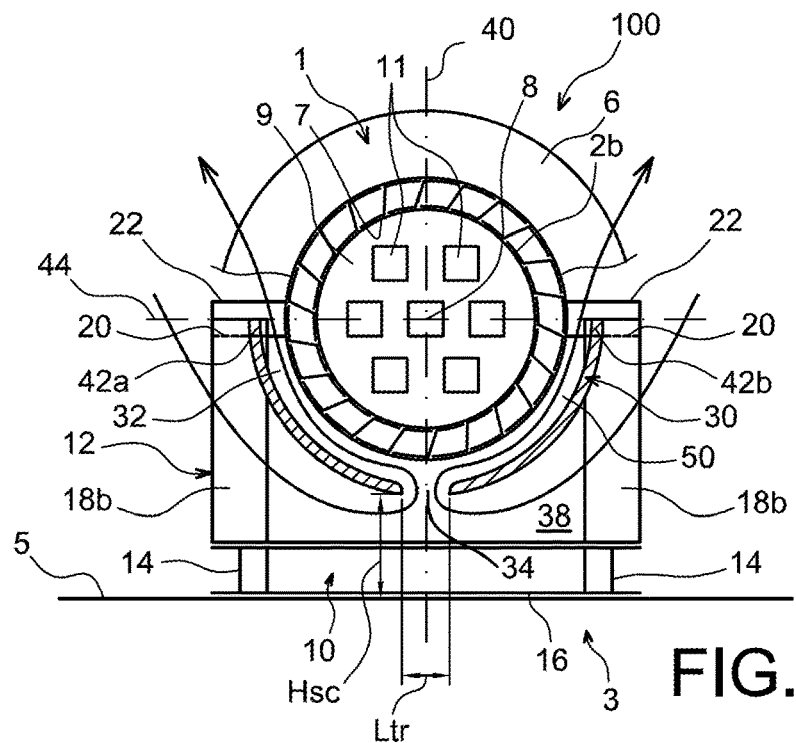
FIG. 3 is a transverse cross-section view taken along line III-III of FIG. 2.

In reference first to FIGS. 1 to 3, an assembly 100 according to a first preferred embodiment of the invention is represented, this assembly 100 comprising a package 1 for transporting/storing radioactive materials, as well as a supporting device 3 supporting the package. In this embodiment, the device 3 takes the form of a transporting/storing chassis resting for example on the surface of the ground 5. The package 1 is independent of the supporting device 3, on which it can be temporarily attached removably, for example using straps, reinforcements, trunnions, etc.

Conventionally, the package 1 is provided with a side body 2, a bottom and a lid sealing a package aperture opposite to the bottom. The bottom and the lid can be respectively covered with two shock absorbing caps 6 mounted at the ends of the package body, as is visible in FIGS. 2 and 3.

The package 1 has a longitudinal axis 8 centred relative to the side body 2, and passing through the lid as well as the bottom of the same package. The axis 8 is arranged substantially in parallel with the chassis 3. Thus, when the package 1 rests in a horizontal position on the chassis 3, its longitudinal axis 8 is also horizontally oriented.

Also conventionally, the package forms an external envelope of a pack and defines a cavity 7 acting as a radioactive material housing, and possibly a storage basket 9. The radioactive materials can for example be waste cases, or even nuclear fuel assemblies 11.

The feature of the invention resides in the design of the transporting/storing chassis 3, which will be now detailed still in reference to FIGS. 1 to 3.

Overall, the chassis 3 includes a structural base 10, as well as means 12 for supporting the package which are carried by the base 10.

In this first preferred embodiment, the structural base is made from main stringers 14 extending horizontally along the longitudinal direction of the assembly, as well as from connecting stringers 16 connecting the main stringers 14 and extending horizontally along the transverse direction of the assembly 100. All the stringers 14, 16 are situated preferably in a same plane, corresponding to the plane of the structural base 10.

The supporting means 12 are in turn distributed into first supporting means associated with a package head part 2a, and second supporting means associated with a package bottom part 2b. More precisely, the first supporting means comprise two posts 18a vertically upwardly projecting from the structural base, whereas the second supporting means comprise two posts 18b analogously projectingly arranged.

The first and second posts 18a, 18b each include, at an upper end, a housing 20 receiving a manipulation trunnion 22 equipping the package side body 2. Each trunnion 22 is conventionally projectingly arranged transverse from this side body 2, the external diameter of which is between 1 and 2.5 m. When this side body is equipped with cooling fins at the periphery thereof, this diameter value integrates the presence of these fins.

The axial spacing distance Dea between the first and second posts 18a, 18b is between 1.5 and 4 m, whereas the total length Lt of the side body 2 is between 2 and 6 m, these values being considered along the direction of the axis 8, corresponding to the axial/longitudinal direction of the assembly 100.

In this embodiment, the space between the first and second posts 18a, 18b is functionalised, since it integrates a cooling air guide shroud 30 for the package by natural convection.

This shroud 30 is located at least partly above the structural base 10, and defines an upwardly open cavity 32 in which a part of the package is intended to be housed when the same is supported in a horizontal position on the first and second posts 18a, 18b. To allow draught, the shroud 30 comprises, in a bottom part thereof, at least one cooling air intake aperture 34 in the cavity 32. This aperture 34 is arranged at a bottom point of the shroud, and preferably extends on an axial length identical to the axial length La of the shroud, substantially identical to the axial spacing distance Dea between the first and second posts 18a, 18b. Indeed, a first axial end 36a of the shroud is attached to the first posts 18a, whereas a second axial end 36b opposite to the first one is attached to the second posts 18b.

In this preferred embodiment, the shroud 30 is generally of a semi-cylindrical shape, with a generally semi-circular shaped transverse cross-section, the centre of which is located on or in close proximity of the axis 8. In the preferred case where the aperture 34 extends on the entire axial length La of the shroud 30, the latter thereby takes the form of two cylinder quarters separated by the aperture 34, the transverse width Ltr of which is between 100 and 500 mm, and preferably about 300 mm.

Furthermore, a free space 38 is provided under the shroud, the bottom limit of this free space consisting of the ground surface 5 between the main stringers 14. At the bottom point of the shroud 30, the under-shroud height Hsc of this free space 38 is between 50 and 400 mm, and preferentially in the order of 200 mm. More generally, for an increased efficiency, the under-shroud height Hsc is such that it is higher than or equal to half the transverse width Ltr of the cooling air intake aperture 34.

The median axial vertical plane 40 of the assembly 100 passes longitudinally and symmetrically through the aperture 34. On either side of this plane 40, the shroud 30 has two opposite transverse ends 42a, 42b, each located on or in the proximity of a median horizontal axial plane 44 of the package 1. The trunnions 22 equipping the side body 2 have also this median plane 44 passing symmetrically therethrough.

In reference more specifically to FIG. 3, it is noted that the internal surface of the shroud and the external surface of the side body of the package define therebetween a cooling air circulation channel 50, with an average thickness between 50 and 200 mm. By having this thickness substantially constant and relatively low, that is by applying a parallelism between both abovementioned surfaces defining the channel 50, the cooling air can indeed circulate at best about the assembly, by natural convection. More precisely, the shroud 30 specific to the invention enables the package cooling to be improved in a horizontal position, at its bottom part, by virtue of a natural convection effect of the air which first penetrates the aperture 34, before circulating in the channel 50, and then upwardly escaping at the transverse ends 42a, 42b of this shroud. The conventionally hot zone at the bottom part of the assembly is thus advantageously reduced in terms of extent and maximum temperature, at a lesser cost without lowering the thermal power allowed within the package.

Figure 3A:
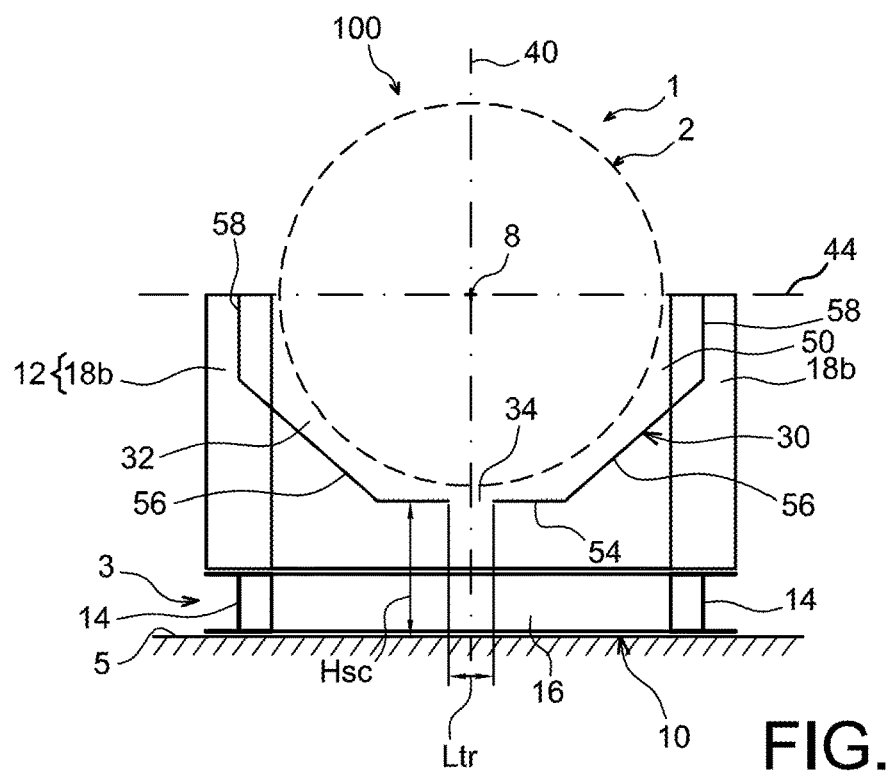
FIG. 3a is a view similar to the previous figure, with the shroud of the supporting device having another embodiment.

According to another embodiment represented in FIG. 3a, the shroud 30 has a generally semi-octagonal shaped transverse cross-section, the side 54 closest to the structural base 10 of which is arranged in parallel to the horizontal direction, that is parallel to the axis 8. In this embodiment, the median axial vertical plane 40 of the supporting device makes up a plane of symmetry for the shroud 30, whereas the other median plane 44 delimits upwardly the octagonal half cross-section. Both tilted lateral sides 56 enable a greater amount of air to be sucked and facilitate the gradual downward cold air descent. In this embodiment, the thickness of the channel 50 between the shroud 30 and the external surface of the lateral body 2 is slightly variable because of the geometry difference between both facing elements. Its average thickness remains however in the abovementioned value range.

The horizontal side 54 closest to the structural base 10 is pierced with the cooling air intake aperture 34, centred on the same side 54.

The shroud 30 is for example made using a plate with a thickness of 1 to 5 mm, folded at the angles of the octagonal half cross-section.

Figure 3B:
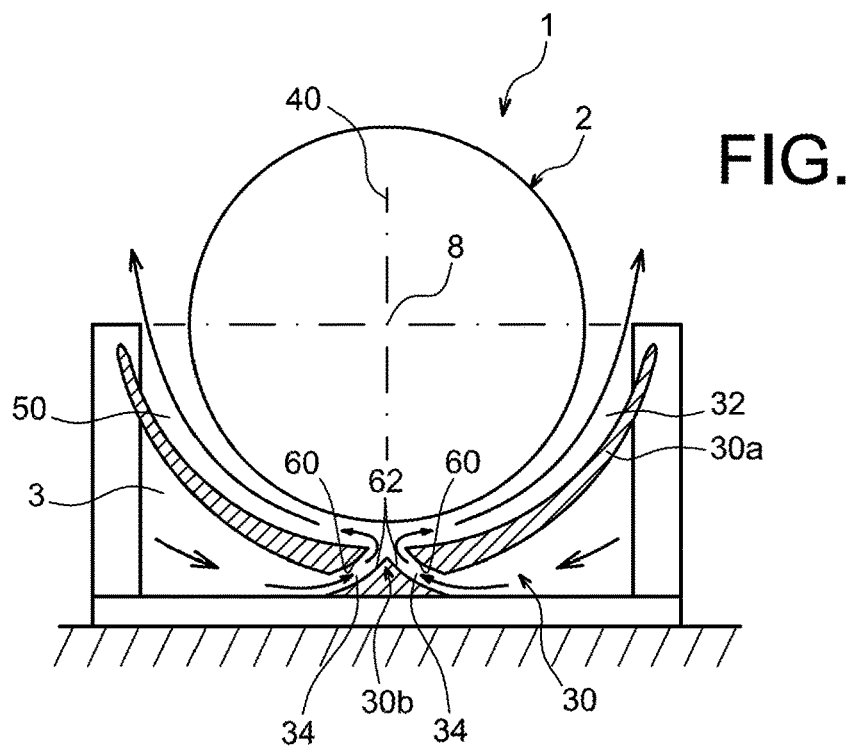
FIG. 3b is a view similar to that of FIG. 3, with the shroud of the supporting device having yet another embodiment.

According to yet another embodiment shown in FIG. 3b, the shroud 30 has a first part 30a analogous to the shroud 30 of FIG. 3, in that it has a generally semi-circular shape transverse cross-section. However, this first part 30a integral with the posts 18, 18b has a thickness increasing from top to bottom, to form two longitudinal lower rims 60, each facing another rim 62 formed by a second part 30a of the shroud, attached to the structural base 10 at an upper part thereof. By way of example, the second part 30b is in the form of a longitudinal structure parallel to the axis 8, and with a triangular transverse cross-section such that two of its sides respectively form both rims 62.

Each couple of rims 60, 62 forms a cooling air intake aperture 34, the orientation of which can be controlled. Preferably, the aperture 34 located vertically close to the bottom point of the package 1, but on the left side of the median plane 40, is oriented to deliver air to the right in the channel 50, whereas the aperture 34 located on the right side of the median plane 40 is oriented to deliver air to the left in the channel 50. That enables the cooling air to be moved closest to the critical bottom point of the package 1, for a better cooling.

Figure 4:
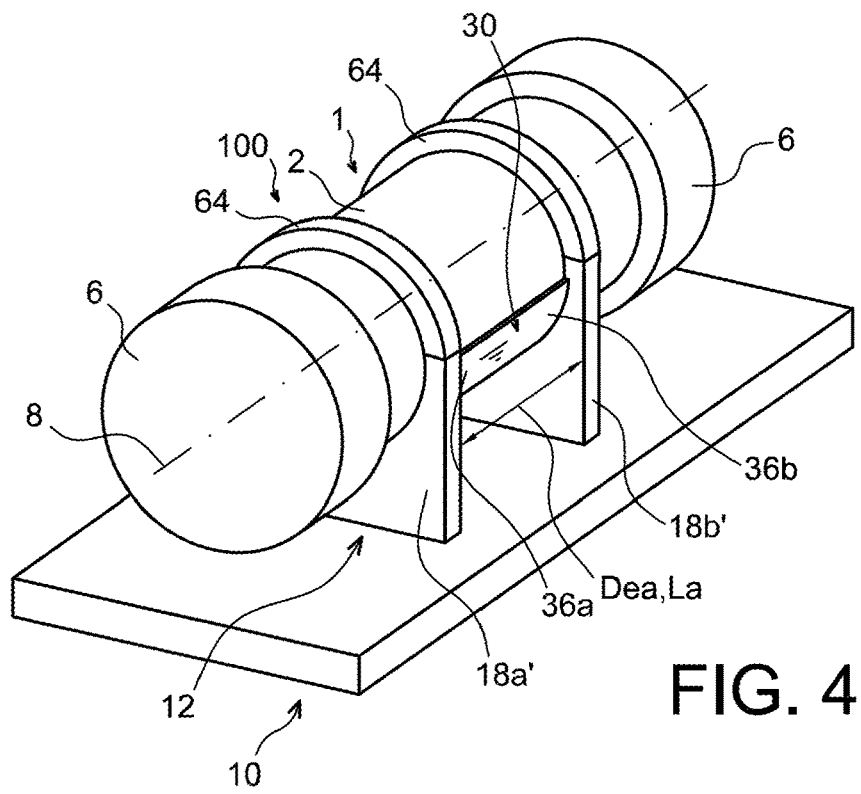
FIG. 4 shows a perspective view of an assembly according to a second preferred embodiment of the invention, integrating a radioactive material transporting/storing package as well as its supporting device.

According to a second preferred embodiment of the invention represented in FIG. 4, the first and second supporting means have here the form of two cradles 18a', 18b', on which the side body 2 of the package 1 rests. The cradles can be closed on top by reinforcements 64 enabling the side body of the package to be fully surrounded, in order to improve holding thereof.

In this second embodiment, the structural base 10 can be identical or analogous to that of the previous embodiment, or be in a more solid shape, as has been depicted in FIG. 4.

The shroud 30 extends along the same axial length La, also corresponding to the axial spacing distance Dea between both cradles 18a', 18b'.

Figure 5:
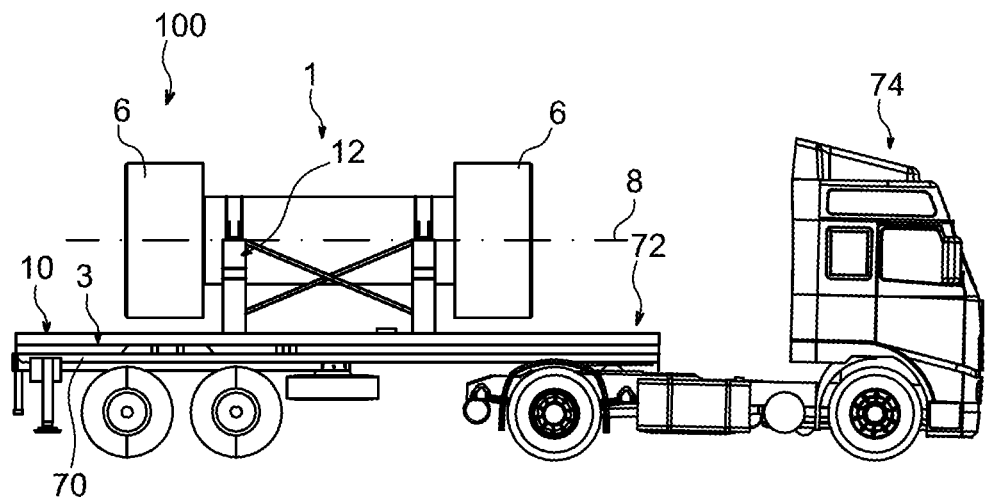
FIG. 5 is a side view of a road radioactive material transporting system, integrating an assembly according to the invention.

Regardless of the contemplated design, it is noted that according to a first application discussed above, the supporting device 3 forms a package transporting/storing chassis, possibly intended to be manipulated with the package when the same is supported by the device. In this case, the chassis can for example be placed on the platform of a radioactive material transporting system, for example the platform of a railway car belonging to a railway transport system, or even the platform 70 of a trailer 72 belonging to a road transport system 74, as has been depicted in FIG. 5.

Figure 6:
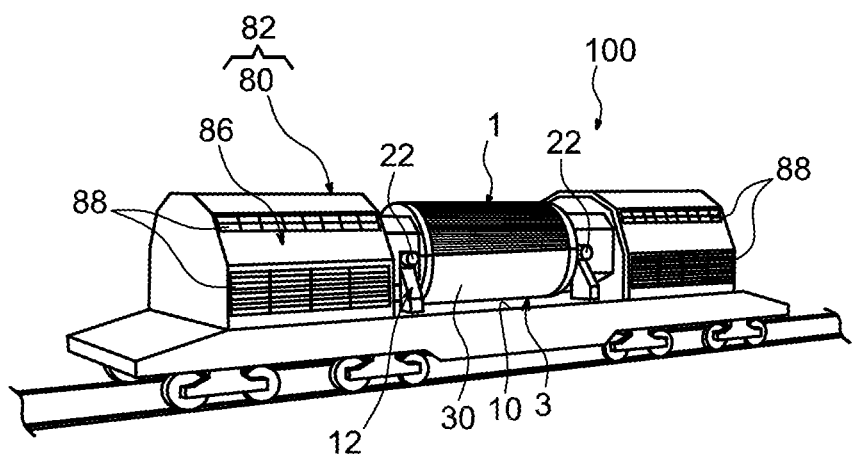
FIG. 6 is a perspective view of a railway radioactive material transporting system integrating an assembly according to the invention.

Alternatively, as has been depicted in FIG. 6, it is provided that the structural base 10 forms all or part of a platform of a railway car 80 belonging to a railway transport system 82, or forms all or part of a platform of a trailer belonging to a road transport system. In this application, the supporting device according to the invention is directly integrated to the structure of the transport system, such that it is not designed to be manipulated, but intended to fixedly remain on the vehicle of which it is an integral part.

In FIG. 6, the railway car 80 is conventionally equipped with a so-called "canopy" element 80, mounted to the platform 10 of this railroad car and intended to cover the assembly 100. This element 86 can be provided in several parts sliding on the platform, and equipped with grids 88 enabling introduction and discharge of air, in particular for circulating the cooling air intended to pass through the shroud 30 specific to the invention.

Of course, various modifications can be provided by those skilled in the art to the invention just described, only by way of non-limiting examples.

What is claimed is:

1. A supporting device (3) for supporting a radioactive material transporting/storing package (1) in a horizontal position, the supporting device comprising a structural base (10) as well as supporting means (12) for supporting the package which are carried by said structural base from which they upwardly project, characterised in that it further comprises, being located at least partly above the structural base (10), a cooling air guide shroud (30) of the package by natural convection, said shroud (30) defining an upwardly open cavity (32) in which a part of the package is intended to be housed when this package (1) is supported in a horizontal position on the device, said shroud (30) comprising, in a bottom part thereof, at least one aperture (34) for taking in cooling air in said cavity (32).

2. The supporting device according to claim 1, characterised in that said supporting means (12) comprise first supporting means intended to receive package head part (2*a*), as well as second supporting means intended to receive a package bottom part (2*b*), said first and second supporting means being axially spaced apart by an axial spacing distance (Dea), and in that the air guide shroud (30) has preferably an axial length (The) substantially identical to the axial spacing distance (Dea).

3. The supporting device according to claim 2, characterised in that said shroud (30) includes a first axial end (36*a*) attached to said first supporting means, as well as a second axial end (36*b*) attached to said second supporting means.

4. The supporting device according to claim 2, characterised in that said shroud (30) is attached to said structural base (10).

5. The supporting device according to claim 2, characterised in that the axial spacing distance (Dea) is between 1.5 and 4 m.

6. The supporting device according to claim 1, characterised in that said shroud (30) is generally of a semi-cylindrical shape, pierced by said at least one cooling air intake aperture (34).

7. The supporting device according to claim 6, characterised in that a transverse cross-section of said shroud (30) is generally of a semi-circular shape.

8. The supporting device according to claim 6, characterised in that a transverse cross-section of said shroud (30) is generally of a semi-octagonal shape, the side (54) closest to the structural base (10) of which is arranged in parallel with the horizontal direction.

9. The supporting device according to claim 8, characterised in that said side (54) closest to the structural base (10) is pierced by said at least one cooling air intake aperture (34).

10. The supporting device according to claim 1, characterised in that said at least one cooling air intake aperture (34) is arranged at a bottom point of the shroud (30).

11. The supporting device according to claim 1, characterised in that said at least one cooling air intake aperture (34) extends on the entire axial length (La) of the shroud.

12. The supporting device according to claim 1, characterised in that said at least one cooling air intake aperture (34) has a transverse width (Ltr) between 100 and 500 mm, and is preferentially in the order of 300 mm.

13. The supporting device according to claim 12 combined, characterised in that said under-shroud height (Hsc) is higher than or equal to half the transverse width (Ltr) of the cooling air intake aperture (34).

14. The supporting device according to claim 1, characterised in that a free space (38) is provided under said shroud (30), said free space having, at a bottom point of the shroud (30), an under-shroud height (Hsc) between 50 and 400 mm, and preferentially in the order of 200 mm.

15. The supporting device according to claim 1, characterised in that it forms a package transporting/storing chassis (3), possibly intended to be manipulated with the package (1) when the latter is supported by the device.

16. The supporting device according to claim 1, characterised in that the structural base (10) forms all or part of a platform of a railroad car belonging to a railway transport system (82), or forms all or part of a platform of a trailer belonging to a road transport system.

17. An assembly (100) comprising a radioactive material transporting/storing package, as well as a supporting device (3) according to claim 1, said package (1) being supported in a horizontal position on said device (3), with a part of a side body (2) of the package which is housed in said cavity (38) defined by the cooling air guide shroud (30).

18. The assembly according to claim 17, characterised in that said package (1) includes manipulation trunnions (22), and in that said supporting means (12) include housings (20) each receiving one of said trunnions (22).

19. The assembly according to claim 17, characterised in that said supporting means (12) include at least two cradles (18*a*', 18*b*') on which the side body (2) of the package (1) rests.

20. The assembly according to claim 17, characterised in that the side body (2) of the package includes an external diameter between 1 and 2.5 m.

21. The assembly according to claim 17, characterised in that said cooling air guide shroud (30) have two opposite transverse ends (42*a*, 42*b*), each located on or in the proximity of a median axial horizontal plane (44) of the package.

22. The assembly according to claim 17, characterised in that the internal surface of the shroud (30) and the external surface of the side body (2) of the package define therebetween a cooling air circulation channel (50), with an average thickness between 50 and 200 mm.

23. The assembly according to claim 17, characterised in that the internal surface of the shroud (30) and the external surface of the side body (2) of the package (1) define therebetween a cooling air circulation channel (50) with a substantially constant thickness.

24. A road or railway radioactive material transport system (74, 82), comprising a supporting device (3) according to claim 1, said structural base (10) of the supporting device (3) being fastened to a platform (70) of the transport system, or forming all or part of this platform.

* * * * *